United States Patent [19]
Khan et al.

[11] Patent Number: 5,115,363
[45] Date of Patent: May 19, 1992

[54] HEAD/GIMBAL ASSEMBLY HAVING LOW STIFFNESS CROSS BAND FLEXURE

[75] Inventors: Amanullah Khan, Holden; Neville K. Lee, Sherborn, both of Mass.

[73] Assignee: Digital Equipment Corporation, Maynard, Mass.

[21] Appl. No.: 482,027

[22] Filed: Feb. 16, 1990

[51] Int. Cl.⁵ .................. G11B 5/60; G11B 15/64; G11B 17/32; G11B 21/20
[52] U.S. Cl. .................... 360/104; 360/103; 360/107
[58] Field of Search .............. 360/103–106, 360/110, 137

[56] References Cited

U.S. PATENT DOCUMENTS

| | | | |
|---|---|---|---|
| 3,065,460 | 11/1962 | Altenau et al. | 360/103 |
| 3,202,772 | 8/1965 | Thomas, Jr. et al. | 360/103 |
| 3,581,298 | 5/1971 | Billawala | 360/103 |
| 3,668,668 | 6/1972 | Robitschek | 360/103 |
| 3,956,770 | 5/1976 | McWhinnie et al. | 360/103 |
| 4,167,765 | 9/1979 | Watrous | 360/103 |
| 4,245,267 | 1/1981 | Herman | 360/103 |
| 4,250,530 | 2/1981 | Yang | 360/105 |
| 4,261,024 | 4/1981 | Dessere | 360/104 |
| 4,280,156 | 7/1981 | Villette | 360/105 |
| 4,286,297 | 8/1981 | Root et al. | 360/103 |
| 4,399,476 | 8/1983 | King | 360/104 |
| 4,620,251 | 10/1986 | Gitzendanner | 360/103 |
| 4,724,500 | 2/1988 | Dalziel | 360/103 |
| 4,740,854 | 4/1988 | Shibuya et al. | 360/104 |
| 4,797,763 | 1/1989 | Levy et al. | 360/103 |

*Primary Examiner*—Aristotelis Psitos
*Assistant Examiner*—Alfonso Garcia
*Attorney, Agent, or Firm*—Arnold, White & Durkee

[57] ABSTRACT

A gimbal-type flexure having a lateral cross band support member for flexibly coupling a transducer slider to a load beam on the actuator arm of a disc type data storage drive.

16 Claims, 7 Drawing Sheets

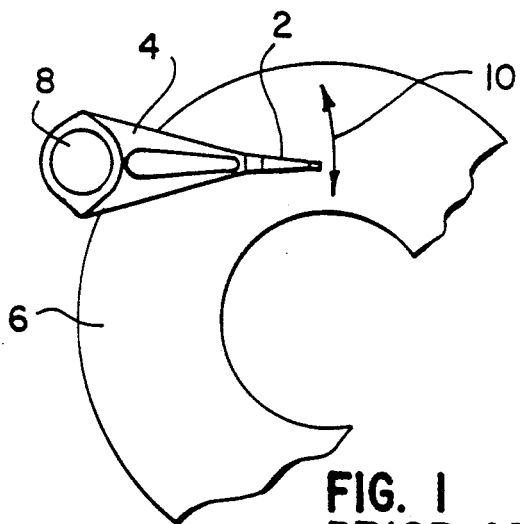
FIG. 1 PRIOR ART
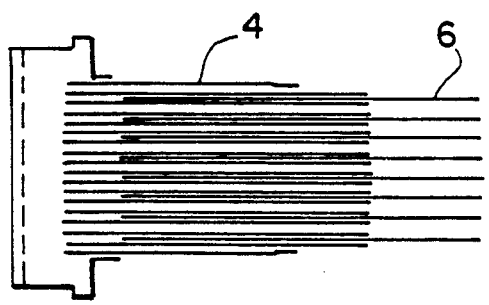
FIG. 2 PRIOR ART
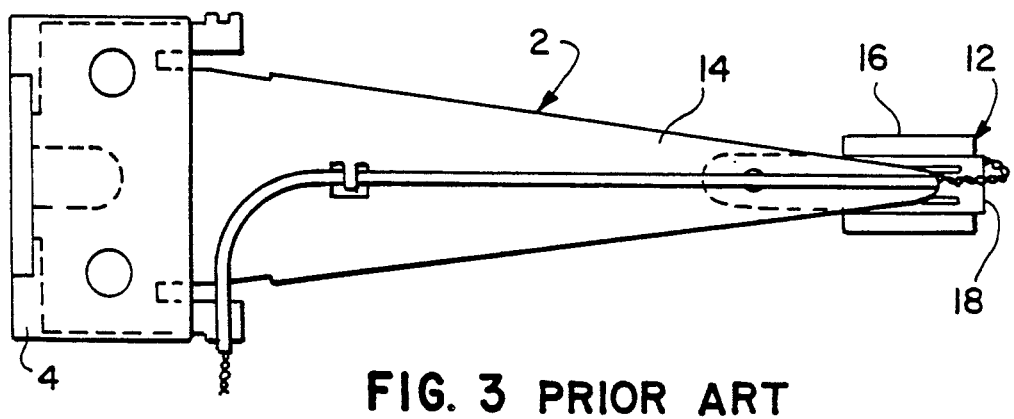
FIG. 3 PRIOR ART
FIG. 4 PRIOR ART
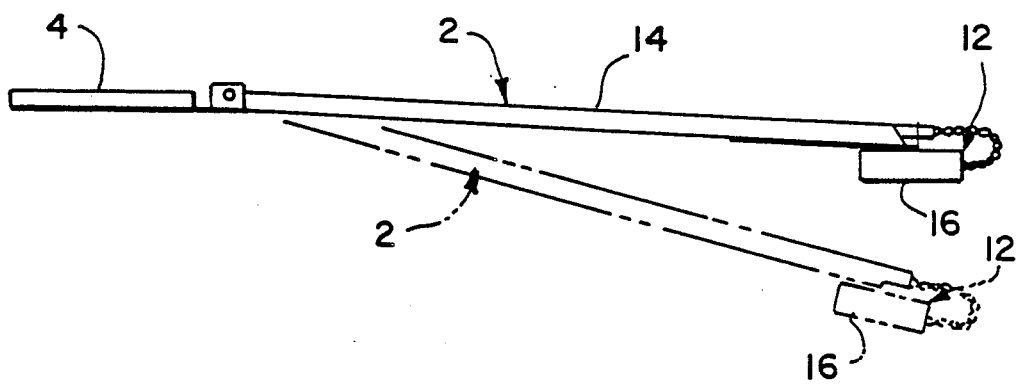

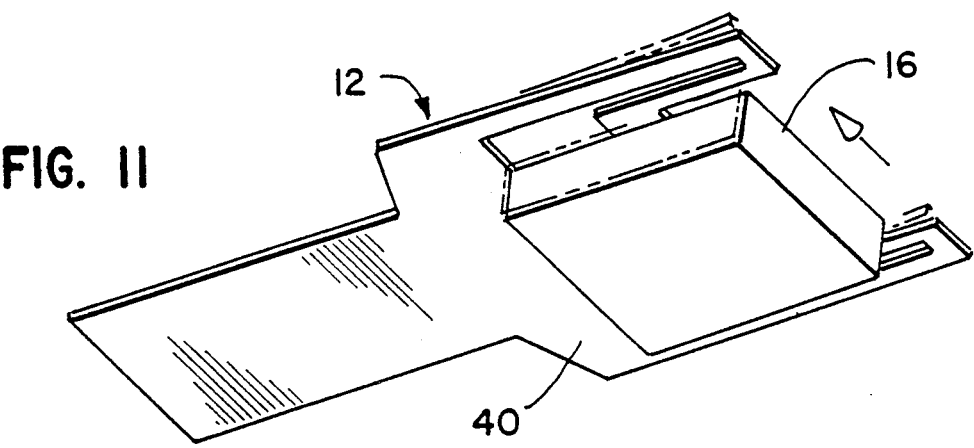
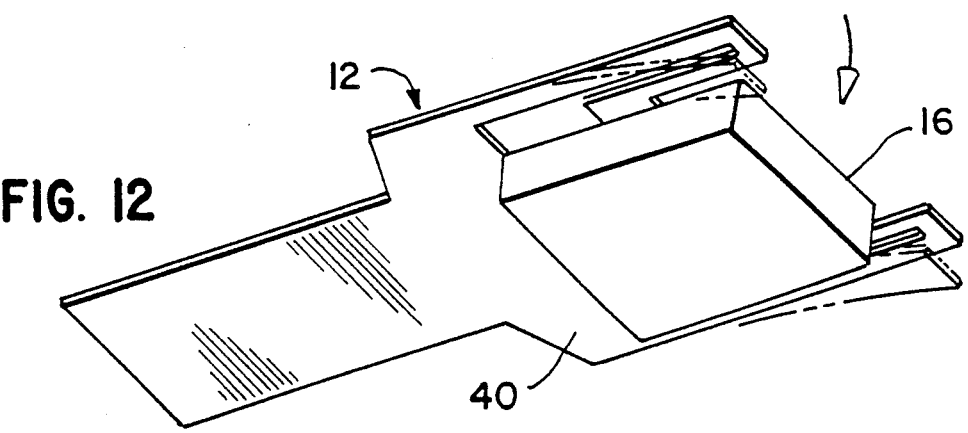
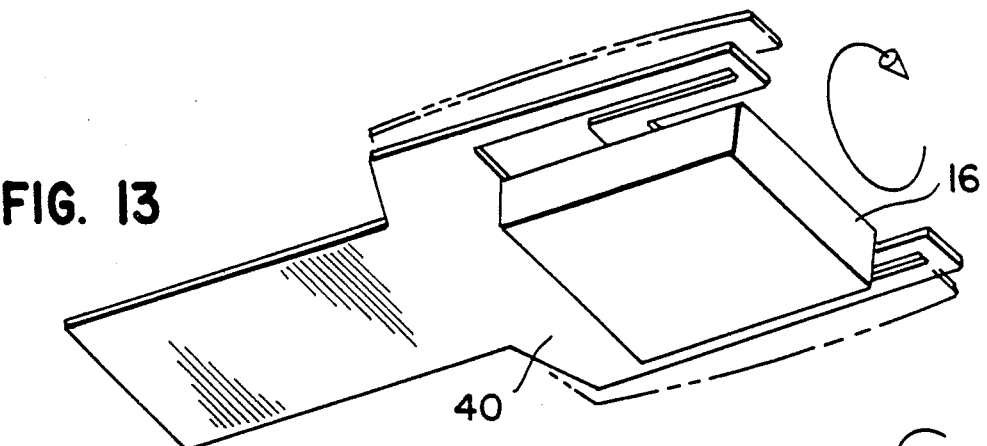
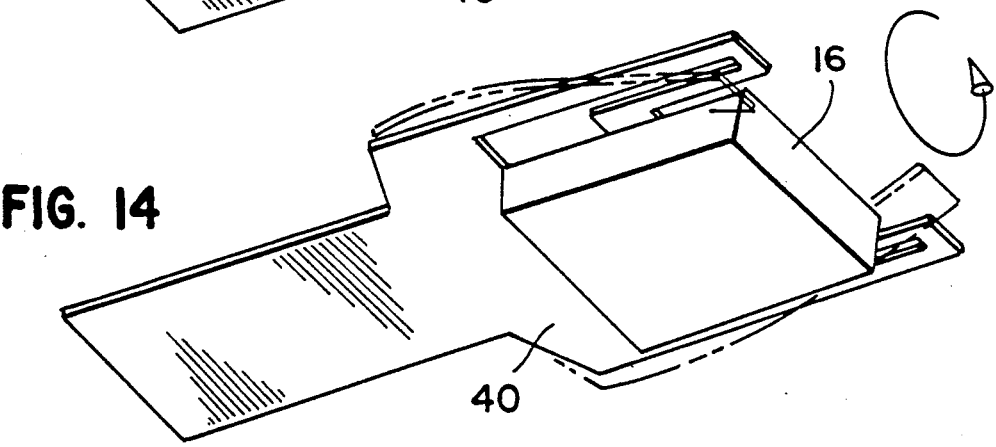

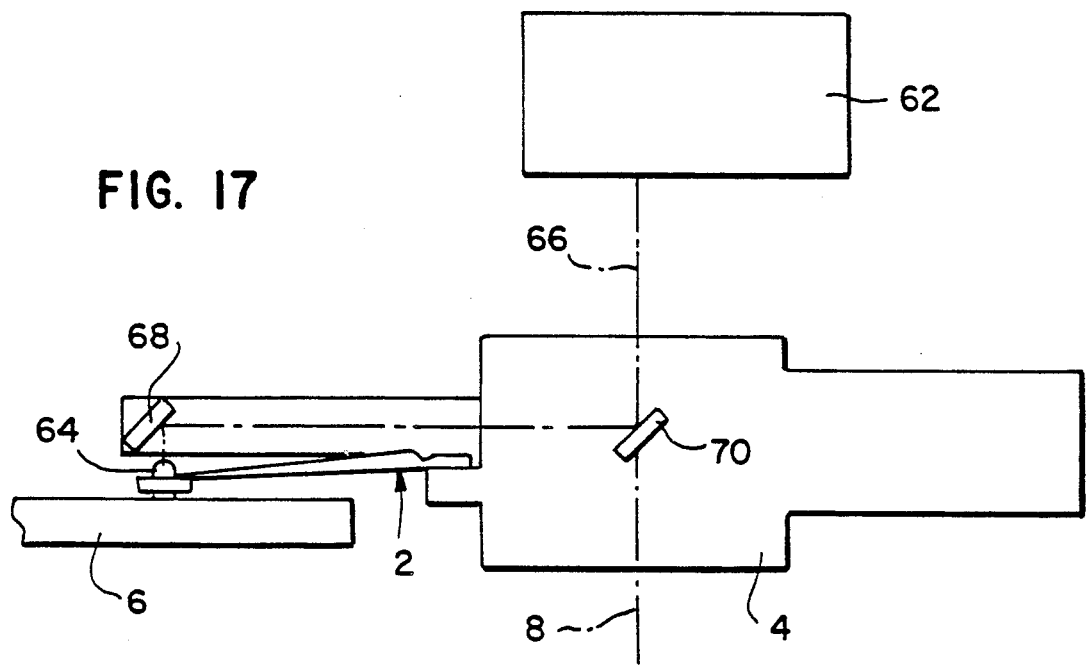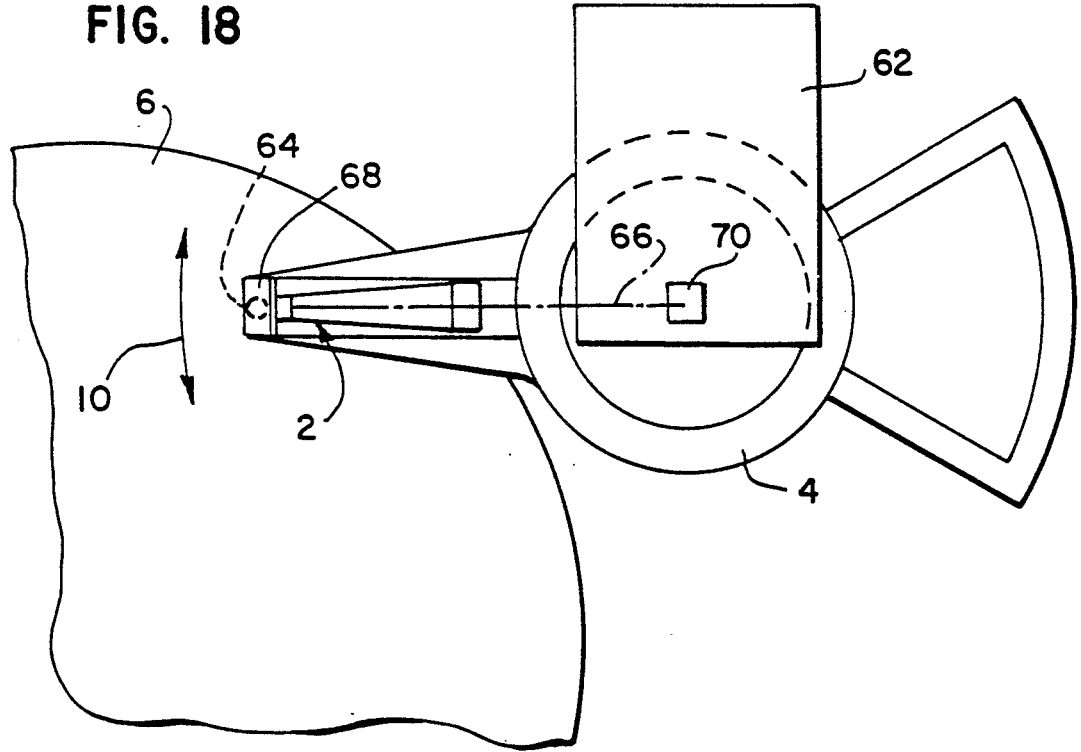

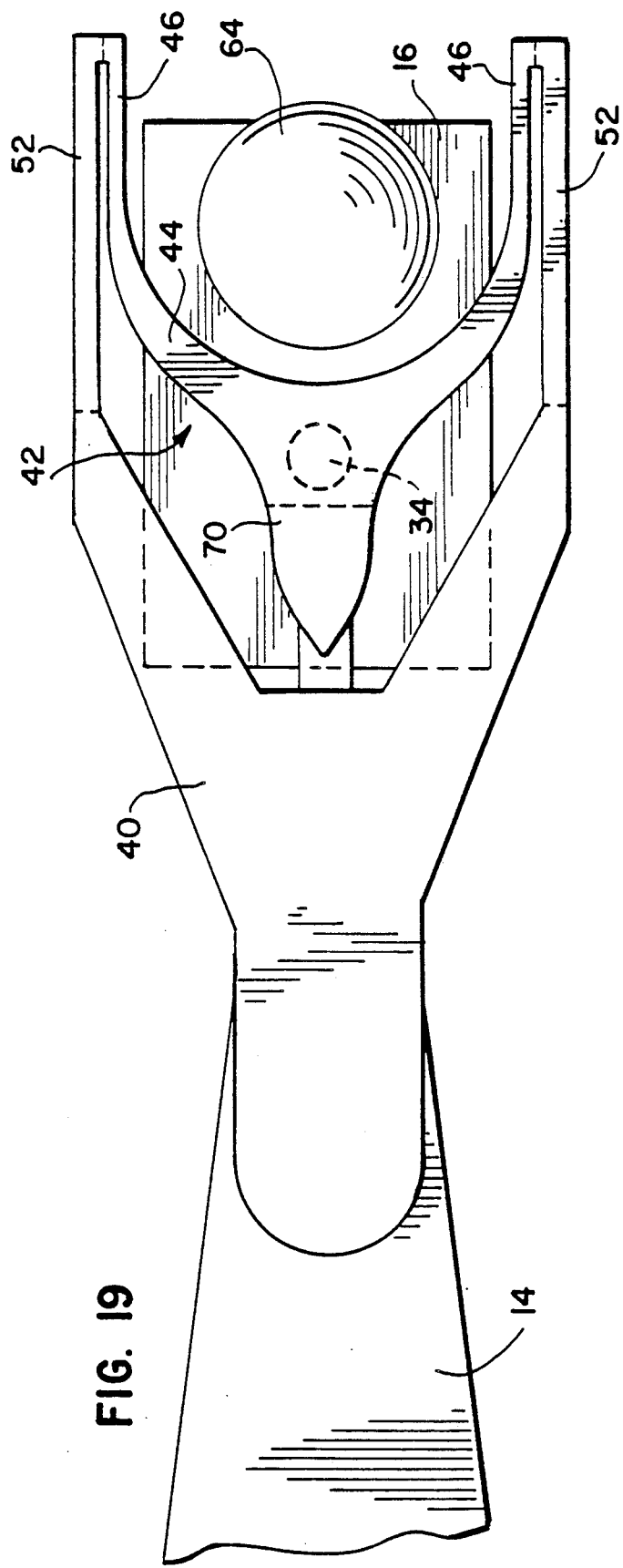
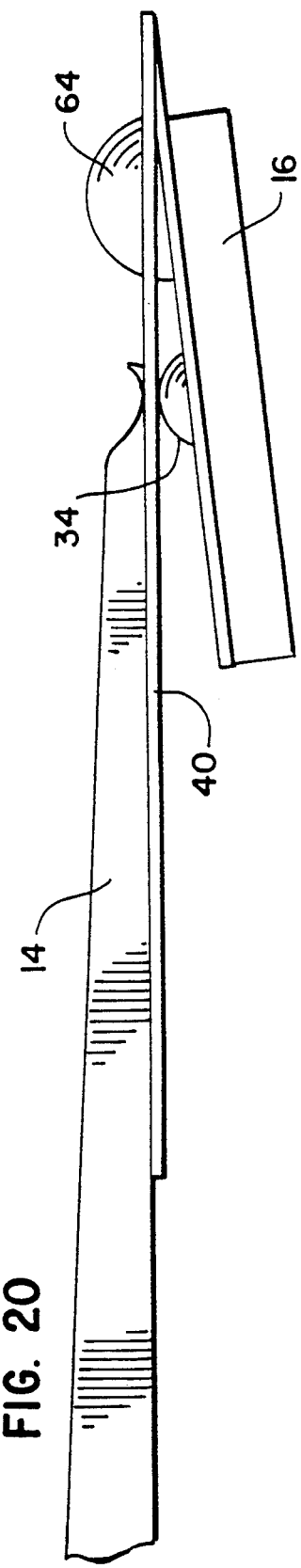
FIG. 19
FIG. 20

HEAD/GIMBAL ASSEMBLY HAVING LOW STIFFNESS CROSS BAND FLEXURE

FIELD OF THE INVENTION

The present invention relates to transducer mounting systems for use in data storage systems, and more particularly to a mounting gimbal for the transducer system with a flying head/gimbal assembly (HGA) in a disc type data storage system.

BACKGROUND OF THE INVENTION

Many magnetic, and some optical, data storage systems of the disc type include read/write transducer systems with flying head/gimbal assemblies (HGA's) to provide a constant air gap between the transducer and the disc during read/write operations. This air gap is on the order of a few microinches to tens of microinches so that it is wide enough to prevent the transducer from crashing against the disc surface, and still narrow enough to prevent data error due to dropout.

The read/write transducer system for a magnetic disc system comprises a read/write head arranged along one edge of a "slider" that has an aerodynamic planar surface designed to lift it away from the surface of the disc when the disc is spinning. The read/write transducer system for an optical disc system has a lens system that is attached to or passes through the body of the slider. The slider is attached to a flexible gimbal, or "flexure," and the flexure is in turn mounted to a "load beam," generally comprising a cantilever spring member to provide a bias force opposed to the force of the air cushion lifting the slider away from the disc surface. The HGA generally comprises the combination of the slider and the flexure. The HGA is attached to the disc drive actuator arm with the load beam. The actuator arm is rotated by the disc drive transducer servo system to provide tracking for the read/write head in the HGA. The height of the actuator arm relative to the disc surface is adjusted so that the HGA flies above the surface of the disc with the required air gap as the disc rotates.

It is essential that the flexure have sufficient compliance to allow the slider sufficient freedom of pitch and roll to maintain the desired constant air gap as the slider glides on the air cushion above the disc surface. Failure to maintain an adequate air gap can cause the transducer to "crash" against the disc surface. Allowing an air gap that is too far or close can cause data storage and retrieval error.

In an effort to reduce the weight of the HGA and improve performance, among other things, the slider has been reduced in both size and weight. The presently used flexure designs do not have adequate compliance to allow sufficient degrees of pitch and roll with the smaller lift forces developed by the smaller sliders. Although the compliance of the existing flexure designs can be increased, existing flexure designs with increased compliance permit inertial moments to be generated by the mounting of the slider on the flexure, and those inertial moments cause undesirable in-plane motion while track seeking. Some optical disc systems require that a lens system be mounted through the top of the slider. In addition, it has become desirable to mount electrical connections pads for magnetic disc systems on the top of the slider. The presently used in-line flexures physically interfere with these lens systems and electrical connections along the top of the slider.

SUMMARY OF THE INVENTION

The present invention comprises an improved transducer mounting head/gimbal assembly (HGA) which is used in disc type data storage systems. The HGA comprises the combination of a slider which has an aerodynamic planar surface designed to lift it away from the surface of the disc when the disc is spinning and a flexible gimbal or "flexure" to which the slider is attached. A load beam, which is generally a cantilever spring member, attaches the flexure to the actuator arm, and it provides a bias force opposed to the force of the air cushion that lifts the slider away from the disc surface when the disc is spinning. The improved HGA of the present invention comprises a flexure having a main body portion, a pair of suspension bands, a cross band support structure which permits mid-sectional, rather than distal, mounting of the slider, and accordingly it combines high compliance with nominal internally generated moments due to the mounting for the slider. The flexure pitches and rolls about a central contact point which is a dimple formed in the cross band support that contacts the load beam. The dimple is in contact with the load beam and provides a pre-load condition for the flexure so that the flexure and the load beam always remain in contact. The cross band flexure configuration reduces crowning of the aerodynamic planar surface of the slider. The cross band flexure configuration also prevents lateral inertial forces from being coupled to it from the slider because the slider is held in the same vertical plane as the direction of the inertial force. The cross band flexure configuration also minimizes interference of the flexure along the top of the slider for applications where this is preferred, such as the above-described lens mounting for optical systems and top mounted electrical connection pads for magnetic systems.

DESCRIPTION OF THE DRAWINGS

FIG. 1 is a top view of disc drive components for a magnetic disc drive system suitable for incorporating the present invention.

FIG. 2 is a side view of the disc drive components shown in FIG. 1.

FIG. 3 is a HGA including a flexure according to the prior art for a magnetic disc drive system.

FIG. 4 is a side view of the HGA shown in FIG. 3.

FIGS. 11 through 14 are flexures according to the present invention with their associated sliders shown in different modes of vibration.

FIG. 12 is a graphical representation of amplitude response as a function of frequency for the HGA with the flexure according to the present invention.

FIG. 17 is a side view of disc drive components for an optical disc drive system suitable for incorporating the present invention.

FIG. 18 is a top view of the disc drive components shown in FIG. 17.

FIG. 19 is a top view of the HGA for an optical disc drive system according to the present invention.

FIG. 20 is a side view of the HGA shown in FIG. 19.

DETAILED DESCRIPTION OF THE PREFERRED EMBODIMENT

Figure 5:
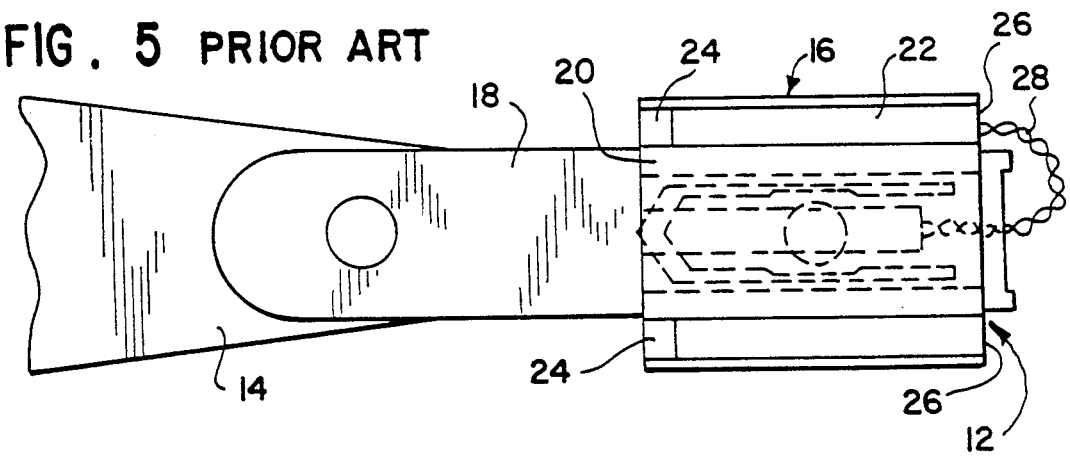
FIG. 5 is an enlarged bottom view of the slider, flexure and forward part of the load beam of the HGA shown in FIG. 3.

Referring to the drawings, wherein like characters designate like or corresponding parts throughout the views, FIG. 1 shows a slider suspension assembly 2 according to the prior art for a magnetic disc data storage system which is mounted on an actuator arm 4 positioned over the surface of a magnetic disc 6. The actuator arm 4 rotates about a pivot point 8 to sweep the slider suspension assembly 2 through an arc across the surface of the disc 6 represented by a bidirectional arrow 10 under control of a disc drive tracking servo system (not shown) that is well known to those of ordinary skill in the art and that does not form any part of this invention.

Typically, a plurality of the actuator arms 4 are vertically stacked to accommodate a plurality of the discs 6 in a disc drive. FIG. 2 is a side view of a typical configuration for such a stack of the arms 4 and the discs 6. Eight of the discs 6 are shown with nine of the actuator arms 4.

FIG. 3 is an enlargement of the slider suspension assembly 2 for a magnetic disc system shown in FIG. 1. The slider suspension assembly 2 comprises a HGA 12 coupled to a load beam 14. The load beam 14 generally comprises a cantilever spring which provides a bias force on the HGA 12 toward the surface of its associated one of the discs 6. The HGA 12 comprises a transducer head slider 16 coupled to a flexure 18. Because of this bias force, the free position of the load beam 14 is generally tilted out of the plane with the actuator arm 4 to which it is mounted toward the surface of the disc 6. The normal operating position of the load beam 14 is generally in the same plane as the actuator arm 4. This is illustrated in FIG. 4, which is a side view of the slider suspension assembly 2 shown in FIG. 3. The normal operating position of the load beam 14 is shown in solid line and the free position is shown in dashed line.

Figure 6:
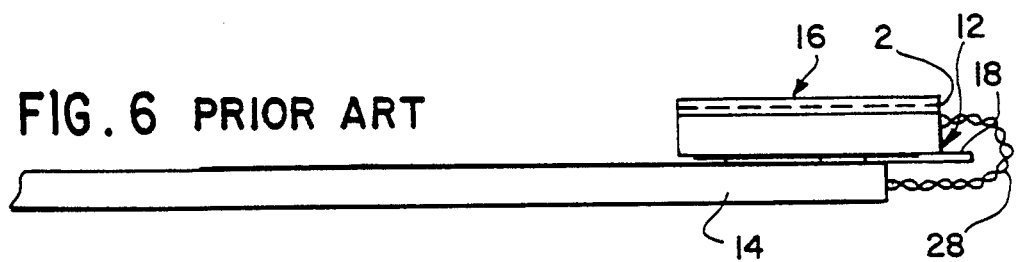
FIG. 6 is an enlarged side view of the slider, flexure and forward part of the load beam of the HGA shown in FIG. 3.

FIGS. 5 and 6 are respective enlarged bottom and side views of the HGA 12 for the magnetic disc system attached to the load beam 14. The slider 16 of the HGA 12 has a generally planar undersurface 20. The undersurface 20 includes a pair of skids 22 which form the main flight surface. Each of the skids 22 comprises a ramp 24 along its leading edge. The trailing edge of each of the skids 22 along the undersurface 20 comprises a read/write head 26. Wiring to the read/write heads 26 is provided with a wiring harness 28 extending from the load beam 14 to one side of the slider 16.

Figure 7:
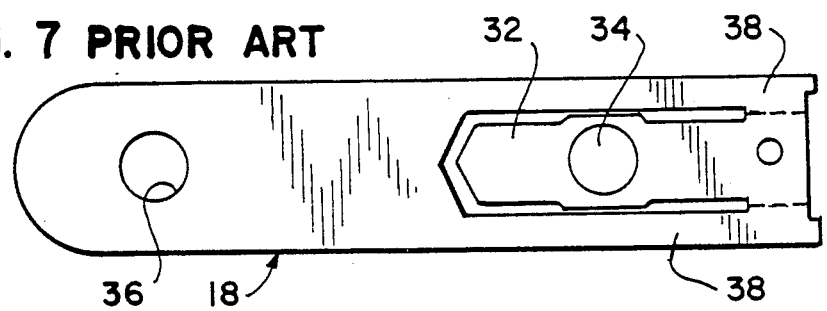
FIG. 7 is a top view of one flexure according to the prior art for a magnetic disc drive system.

The prior art flexure 18 is shown in detail in FIG. 7. The flexure 18 has an inner tongue 32, the bottom surface of which is bonded to the slider 16, such as with an epoxy adhesive, for example. The tongue 32 has a generally centrally mounted dimple 34 which protrudes from the top surface of the tongue 32 to provide a preloaded bearing surface against a mating surface of the load beam 14. The dimple 34 allows the flexure 18 to provide both pitch and roll flexibility for the slider 16 relative to the load beam 14. This is most clearly shown in FIG. 6. The flexure also has at least one alignment aperture 36 to secure the flexure 18 to the load beam 14.

The prior art flexure 18 imparts flexibility to its tongue 32 primarily as a consequence of outer suspension bands 38 which connect the base of the tongue 32 to the remainder of the flexure 18. The degree of flexibility so provided depends on the length, width and thickness of the bands 38. However, providing a high degree of flexibility with this configuration permits the mass of the slider 16 to laterally displace the slider 16 from its central position under the load beam 14 when the actuator arm 4 is operated. Furthermore, the coupling of the tongue 32 to the remainder of the flexure 18 by the bands 38 allows the mass of the slider 16 to generate a moment with a length corresponding to the length of the bands 38.

Consequently, the bands 38 must maintain a minimum level of stiffness to prevent the mass of the slider 16 from dislodging the slider 16 from its normal position, particularly during rapid motions such as during the tracking seeking mode. However, the stiffness required to overcome this unwanted deflection then prevents the flexure 18 from supplying the slider 16 with a sufficient degree of pitch and roll to let it follow the surface of the disc 6.

Figure 8:
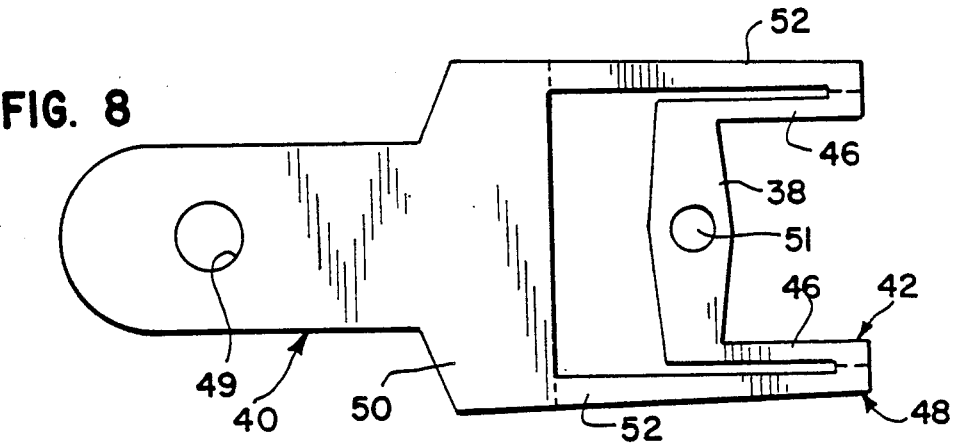
FIG. 8 is a top view of a flexure according to the present invention for a magnetic disc drive system.

The HGA of the present invention overcomes the difficulties of the prior art with a flexure that has greatly increased compliance for pitch and roll of the slider and yet does not permit the mass of the slider to generate a moment about its mounting on the flexure. A preferred embodiment of a flexure 40 according to the present invention for a magnetic disc system is shown in FIG. 8. The flexure 40 has a generally "U"-shaped inner support member 42. Although shown with a generally rectilinear "U"-shaped configuration, it may be generally curvilinear instead, as explained in connection with FIGS. 19 and 20 below. The inner support member 42 comprises a generally narrow cross band portion 44 which generally forms the bottom of the "U"-shaped inner support member 42 and extends across it. The cross band portion 44 has a generally centrally located one of the dimples 34 protruding out of the general plane of the cross band portion 44. The inner support member 42 also has a pair of inner suspension band portions 46 which generally form the arms of the "U"-shaped inner support member 42.

The flexure 40 also has a generally fork-shaped outer support member 48. The outer support member 48 comprises a generally planar outer support portion 50 which generally forms the shank of the fork and a pair of outer suspension band portions 52 which generally form the prongs of the fork-shaped outer support member 48. The distal end of each of the outer band portions 52 is coupled to the distal end of a corresponding one of the inner suspension band portions 46 so that the inner support member 42 sits between the outer suspension band portions 52 of the outer support member 48 in the general plane of the outer support member 48. The outer support portion 50 of the outer support member 48 also comprises an alignment aperture 49 positioned for aligning the flexure 40 with the load beam 14 (not shown).

Figure 9:
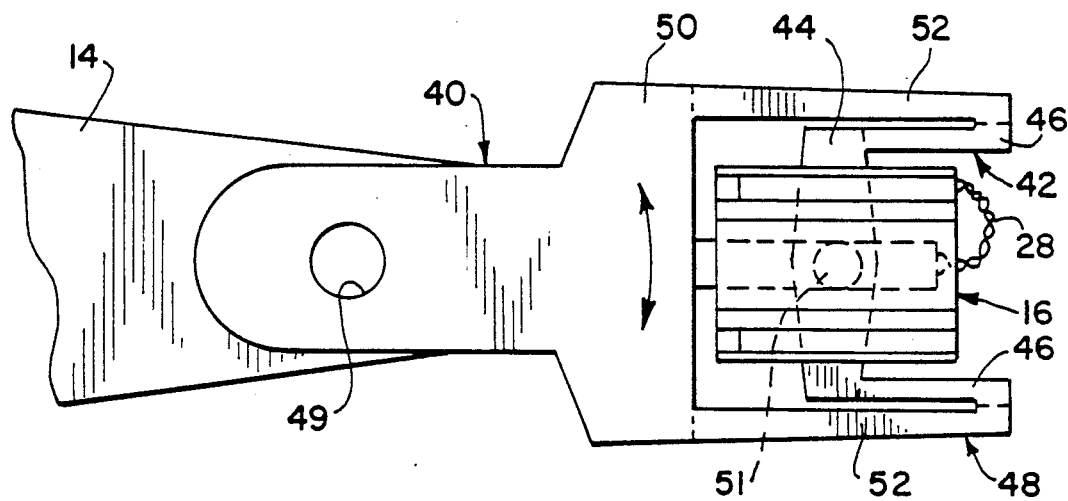
FIG. 9 is an enlarged partial bottom view of the HGA according to the present invention showing the slider, the flexure shown in FIG. 8, and the forward part of the load beam of the HGA.
Figure 10:
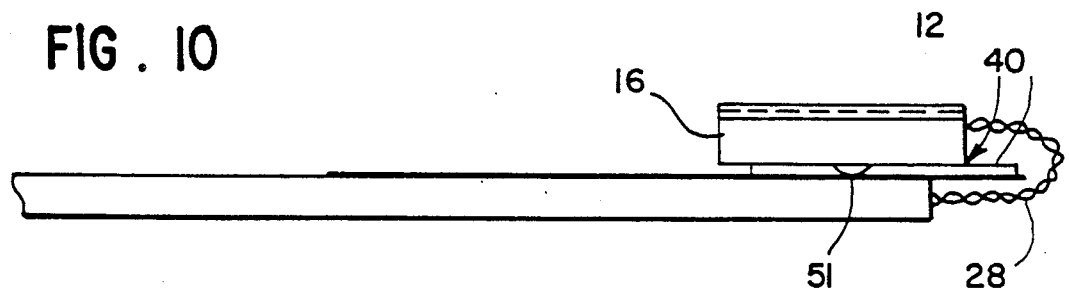
FIG. 10 is an enlarged partial side view of the HGA shown in FIG. 9.

The slider 16 is mounted to the bottom side of the cross band portion 44 of the inner support member 42 for the flexure 40. A dimple 51 protrudes from the top side of the cross band member 44 to provide a preloaded bearing surface for contact with a mating surface of the load beam 14. The dimple 51 allows the flexure 40 to provide both pitch and roll flexibility for the slider 16 relative to the load beam 14. This is most clearly seen in FIGS. 9 and 10, which are bottom and side views of the slider 16 attached to the load beam 14 over the cross band portion 44 of the flexure 40. Because the slider 14 is attached to the cross band portion 44 of the flexure 40, clearance is provided for attaching to the wiring harness 28 along the side of the slider 16 opposite the undersurface 20.

The slider 16 is coupled to the flexure 40 along its mid-section parallel to its leading and trailing edges from one side of the slider 16 to the other with the cross band portion 44 of the flexure 40. Since the slider 16 is so coupled to the flexure 40 along its mid-section in a direction generally transverse to the direction of tracking on any associated one of the discs 6, no moment of inertia can be developed by the slider 16 with this mounting arrangement even with rapid movement of the associated HGA 12 during track seeking operations. In contrast, the prior art flexure 18 is only coupled to the slider 16 along a distal end of the slider 16 generally parallel to the direction of tracking, thus allowing a significant moment of inertia to develop during track seeking operations.

The inner suspension band portions 46 and the outer suspension band portions 52 provide flexible coupling of the slider 16 to the load beam 14. The inner band portions 46 and the outer band portions 52 are generally parallel to each other and they are coupled end to end to create an effective band length approximating the length of the inner band portion 46 added to the length of the outer band portion 52. Thus, a great deal of compliance is obtained by the flexure 40 with a relatively short over-all length.

Table 1 shows the pitch and roll characteristics of flexure and slider combinations achieved with two different flexure designs designated types A and B. The type A design corresponds to the combination with the flexure 18 according to the prior art. The type B design corresponds to the combination with the flexure 40 according to the present invention. The flexures with characteristics described in Table 1 have thicknesses as indicated next to their designated types. These measurements were made with a standard negative pressure design slider 16 having a pitch of 1398 gm-in/rad and roll of 665 gm-in/rad (2.10 pitch to roll ratio).

pitching, respectively. The mode motion is represented in dashed line. Resonant frequencies for the different flexure types A and B with their associated sliders are also shown in the Table 1.

As indicated in the Table 1, the type B design of the flexure 40 according to the present invention has increased pitch and roll compliance relative to the type A design of the flexure 18. It proves an increase in pitch compliance of 1.625 and an increase in roll compliance of 1.125. Each of these flexure designs A and B also have different characteristic resonance frequencies for different modes of motion, or conditions of flexure. For instance, the flexures may have different resonance frequencies depending on different flexure modes as shown in FIGS. 11 through 14. Resonance frequencies for selected modes are each indicated in Table 1 for the flexure designs A and B.

It is desirable that the resonant frequency of the flexure design be as high as possible in all modes so that the mechanical system of the HGA 12 cannot be induced to resonate by ordinary seeking and tracking operations. A high natural resonance frequency is desirable so that ordinary seeking and tracking functions do not cause the head/gimble assembly to go into resonance. However, for any given flexure configuration, increasing flexure compliance causes a significant decrease in its resonant frequency. As indicated in the Table 1, the type B design does not have resonance frequencies as high as the prior art type A for equivalent modes of motion. However, the type B design combines higher compliance than the type A design with resonance frequencies for the indicated modes of motion which are still sufficiently high to prevent induced resonance during operation.

Figure 15:
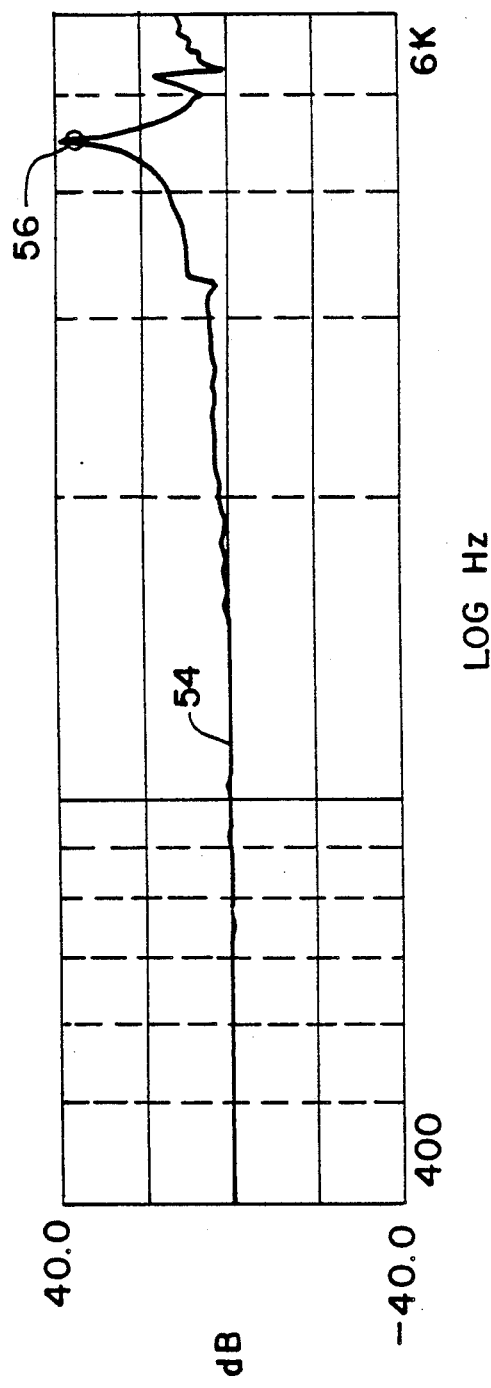
Figure 16:
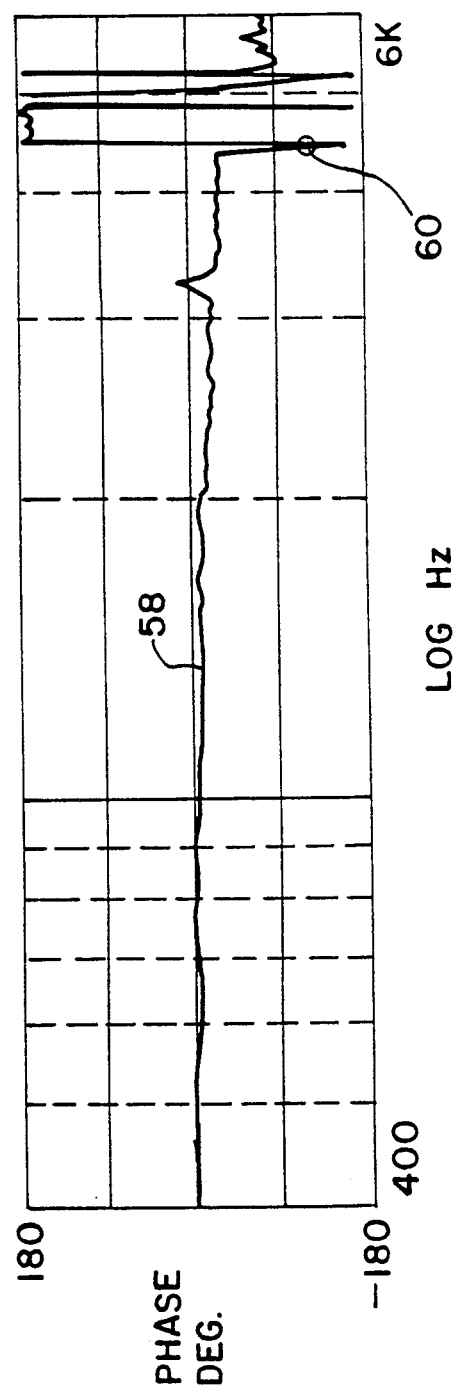
FIG. 16 is a graphical representation of phase shift as a function of frequency for the HGA with the flexure according to the present invention.

FIGS. 15 and 16 show relative amplitude and phase response as a function of frequency for the HGA 12 including the flexure 40 according to the present invention. A line 54 in FIG. 15 represents the amplitude characteristics extending over a range of 400 hertz to 6 kilohertz. A major resonance peak of about 35.7 decibels, represented by a point 56, occurs at a frequency of 4.467 kilohertz. A line 58 in FIG. 16 represents the phase characteristic extending over the same 400 to 6 kilohertz range, with a point 60 representing the phase shift at the resonance frequency of 4.467 kilohertz. These measurements were made with a standard negative pressure design slider 16. The high resonant frequency of the HGA 12 insures that ordinary seeking and tracking operations cannot cause the HGA 12 to go into resonance. The high compliance of the HGA 12 combined with lack of resonances and phase shifts at low frequencies provide a high degree of tracking sta-

TABLE 1

| TYPE/ THICKNESS | PITCH gm-in/ deg | RATIO wrt A (wrt ABS) | ROLL gm-in/ deg | RATIO wrt A (wrt ABS) | MODE (Figure) | FREQUENCY (Hz) |
|---|---|---|---|---|---|---|
| A/0.0015" | 0.0109 | 1.0 (2215) | 0.0181 | 1.0 (645) | Yaw (11) Bending (13) | 3530 7709 |
| B/0.0015" | 0.0066 | 1.625 (3698) | 0.0161 | 1.125 (722) | Yaw (11) Torsion (13) Bending (12) | 2520 5385 5576 |

The flexure 40 according to the present invention described above also combines high compliance with high resonance frequencies regardless of resonance mode. The different resonance modes of the flexure 40 with the slider 16 attached are shown in FIGS. 11 through 14, which represent yaw, bending, torsion and bility.

The present invention is suitable for use in optical disc data storage systems. Side and top views of the essential disc drive components of such a system are shown in FIGS. 17 and 18 respectively. The actuator arm 4 is positioned over the disc 6 and rotates about the pivot point 8 to sweep the slider suspension assembly 2 through an arc represented by the bidirectional arrow 10 under control of the disc drive tracking servo system (not shown) in the same manner as for the magnetic disc system described above in connection with FIG. 1.

However, the optical disc drive system includes a stationary optical system 62 which transmits and receives optical information to the disc 6 via the slider suspension assembly 2 and the actuator arm 4. The stationary optical system 62 is shown in block form in FIGS. 17 and 18 because it is an element well known in the art that does not itself constitute the present invention. The slider 16 of the HGA 12 includes a lens system 64 which passes through the slider 16 to allow an optical beam 66 to be transmitted through the slider 16 and focused upon the surface of the disc 6.

The beam 66 originates in the stationary optical system 62 and is transmitted by the stationary optical system 62 to the pivot point 8 on the actuator arm 4. A first mirror 68 deflects the beam 66 to pass along the actuator arm through the HGA 12. A second mirror 70 deflects the beam 66 through the lens assembly 64 to focus the beam 66 on the surface of the disc 6. The reflected portion of the beam 66 returns through the lens assembly 64 and is returned to the stationary optics system 62 via the optical path formed by the first mirror 68 and the second mirror 70 in the same manner.

Detailed top and side views of the HGA 12 for the optical disc system of FIGS. 17 and 18 are shown in FIGS. 19 and 20 respectively. The slider 16 has the lens system 64 passing through along the trailing end of the slider 16. The lens system 64 may be a multi-element lens assembly or a single lens unit. The flexure 40 is generally as shown in FIG. 8, but with a more curvilinear configuration for the inner support member 42 to more snugly wrap around the lens assembly 64. The cross band portion 44 may include a central tail extension 72 to balance the extra weight added by the lens assembly 64 on the opposite side of the slider 16. The HGA 2 is otherwise the same as described above in connection with FIGS. 8, 9 and 10.

Thus, there has been described herein a HGA for use in disc type data storage systems of both the optical and magnetic type. The flexure of the HGA combines high compliance for slider pitch and roll motion, freedom from internally generated moments, high natural resonance frequencies for all types of motion and simplicity of construction. It will be understood that various changes in the details, arrangements and configurations of parts and systems which have been herein described and illustrated in order to explain the nature of the invention may be made by those skilled in the art within the principle and scope of the invention as expressed in the appended claims.

What is claimed is:

1. A head/gimbal assembly for use in a disc drive having an actuator arm for selective positioning over a moving surface of a disc-type data storage medium and a load beam coupled to said actuator arm for providing a bias force toward said moving disc surface, said head/gimbal assembly comprising:

a generally fork-shaped outer support member having a shank and two prongs, each of said prongs having upper and lower surfaces, a generally planar support portion forming the shank of said outer support member, the upper surface of said shank coupled to said load beam and said outer support member also having a pair of outer suspension band portions generally forming the prongs of said outer support member;

a generally "U"-shaped inner support member having a cross band portion with upper and lower surfaces, said upper surface of said cross band portion having a generally centrally arranged dimple protruding from a plane of the upper surface of said cross band portion abutting against a lower surface of said load beam and said inner support member also having a pair of inner suspension band portions generally forming a pair of arms of said "U"-shaped inner support member, said arms having one end attached to said cross band portion and one distal end and, said inner suspension band portions of said inner support member connected to said outer suspension portions of said outer support member; and a transducer head slider having a transducer head and a slider means with a seeking direction generally transverse to the length of said outer support portions of said outer support member, coupled to the lower surface of said cross band portion of said inner support member between said inner suspension band portions.

2. The head/gimbal assembly recited in claim 1, wherein said inner suspension band portions of said inner support member and said outer suspension band portions of said outer support member are arranged generally parallel to the length of said outer support portion of said outer support member.

3. The head/gimbal assembly recited in claim 1, wherein said cross band portion of said inner support member is arranged adjacent to said outer support portion of said outer support member.

4. The head/gimbal assembly recited in claim 1, wherein said cross band portion of said inner support member has freedom of movement substantially transverse to the general plane of the lower and upper surfaces of said outer support member.

5. The head/gimbal assembly recited in claim 1, wherein said inner support member has a generally rectilinear "U"-shaped configuration.

6. The head/gimbal assembly recited in claim 5, wherein said transducer head of said transducer head slider is of the magnetic type and said cross band portion of said inner support member is coupled to said slider generally across its mid-section and generally parallel to the seeking direction of said slider.

7. The head/gimbal assembly recited in claim 1, wherein said inner support member has a generally curvilinear "U"-shaped configuration.

8. The head/gimbal assembly recited in claim 7, wherein said transducer head of said transducer head slider is of the optical type and said cross band portion of said inner support member is coupled to said slider generally across its mid-section and generally parallel to the seeking direction of said slider, with said cross band portion generally partially circumscribing a lens system of said slider.

9. A substantially planar suspension flexure having a length and a width for use in a head/gimbal assembly of a disc-type data storage system, said flexure comprising:

a generally "U"-shaped inner support member having a cross band portion with upper and lower surfaces and a pair of inner suspension band portions generally forming a pair of arms of said "U"-shaped inner support member, said arms having one end attached to said cross band portion and one distal end, said cross band portion also having a generally centrally located dimple protruding from a general plane of the upper surface of said cross band portion and said inner suspension portions extending generally parallel to the length of said flexure; and a generally fork-shaped outer support member having a shank and two prongs, each of said prongs having upper and lower surfaces and a generally planar outer support section forming the shank of said outer support member and a pair of outer suspension portions generally forming the prongs of said outer suspension member, said outer suspension band portions extending generally parallel to the length of said flexure and connected to said inner suspension band portions of said inner support member along their respective distal ends to allow freedom of movement of said inner support member substantially transverse to the general plane of said outer support member.

10. The flexure recited in claim 9, wherein said inner support member has a generally rectilinear "U"-shaped configuration.

11. The flexure recited in claim 9, wherein said inner support member has a generally curvilinear "U"-shaped configuration.

12. A head/gimbal assembly for the transducer system of a data storage unit having a transducer head slider with a generally planar lower surface for gliding above a moving surface of a data storage medium, said transducer head slider having at least a transducer head and slider means, and said head/gimbal assembly also having a substantially planar suspension flexure, having a length and a width, for flexibly coupling said slider to a load beam and for biasing said transducer head slider toward said moving surface of said data storage medium, comprising:

a generally "U"-shaped inner support member having a cross band portion, generally transverse to the length of said flexure with upper and lower surfaces said lower surface of said cross band portion coupled to said slider and said upper surface of said cross band portion having a generally centrally arranged dimple protruding from a plane of the upper surface of said cross band portion butting against a lower surface of said load beam and said inner support member also having a pair of inner suspension band members generally forming a pair of arms of said "U"-shaped inner support member and extending generally parallel to the length of said flexure, said arms having one end attached to said cross band portion and one distal end; and a generally fork-shaped outer support member having a shank and two prongs, with upper and lower surfaces, a generally planar outer support portion generally forming the shank of said outer support member, the upper surface of said shank coupled to said load beam and said outer support member also having a pair of outer suspension portions generally forming the prongs of said outer suspension member extending parallel to the length of said flexure, said outer suspension band portions of said outer support member connected to said inner suspension band members of said inner support member along their respective distal ends to allow freedom of movement of said inner support member substantially traverse to the general plane of said outer support member.

13. The head/gimbal assembly recited in claim 12, wherein said inner support member has a generally rectilinear "U"-shaped configuration.

14. The head/gimbal assembly recited in claim 13, wherein said transducer head of said transducer head slider is of the magnetic type and said cross band portion of said inner support member is coupled to said slider generally across its mid-section and generally parallel to the seeking direction of said slider.

15. The head/gimbal assembly recited in claim 12, wherein said inner support member has a generally curvilinear, "U"-shaped configuration.

16. The head/gimbal assembly recited in claim 15, wherein said transducer head of said transducer head slider is of the optical type and said cross band portion of said inner support member is coupled to said slider generally across its mid-section and generally parallel to the seeking direction of said slider, with said cross band portion generally partially circumscribing a lens system of said slider.

* * * * *